(No Model.)

L. BELL & F. H. ROOT.
ELECTRIC VALVE CONTROLLER.

No. 437,673.　　　　　　　　Patented Oct. 7, 1890.

WITNESSES:
Frank S. Ober
Thomas K. Trenchard.

INVENTORS
Louis Bell and
Frank H. Root.
BY
W. B. Johnston
ATTORNEY.

UNITED STATES PATENT OFFICE.

LOUIS BELL AND FRANK H. ROOT, OF CHICAGO, ILLINOIS.

ELECTRIC VALVE-CONTROLLER.

SPECIFICATION forming part of Letters Patent No. 437,673, dated October 7, 1890.

Application filed June 18, 1890. Serial No. 355,819. (No model.)

*To all whom it may concern:*

Be it known that we, LOUIS BELL and FRANK H. ROOT, citizens of the United States, residing in Chicago, in the county of Cook and State of Illinois, have invented certain new and useful Improvements in Electric Valve-Controllers, of which the following is a specification.

Our invention relates to devices for electrically controlling fluid-valves; and our object is to produce a compact, simple, and efficient device of this class, and one that can be readily inserted as a coupling in a pipe.

Our invention consists in the construction and combination of parts, as hereinafter described and claimed.

Figure 1:
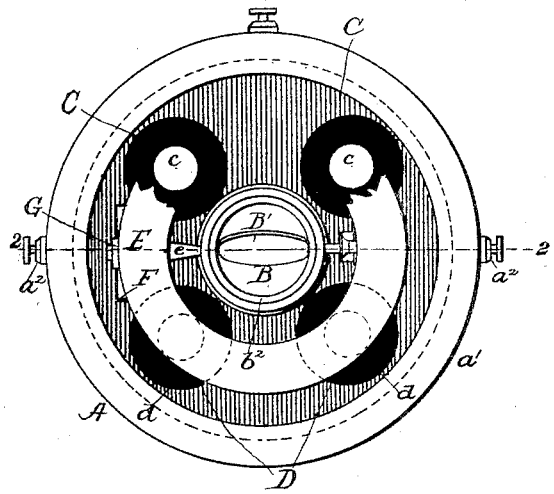
Figure 2:
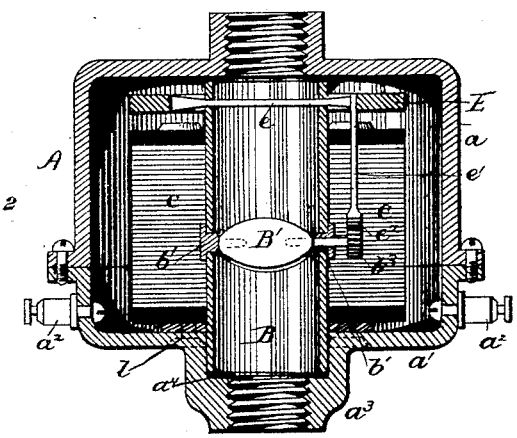
Figure 3:
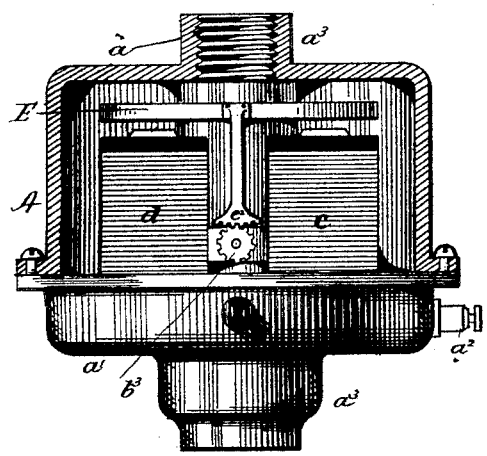
Figure 4:
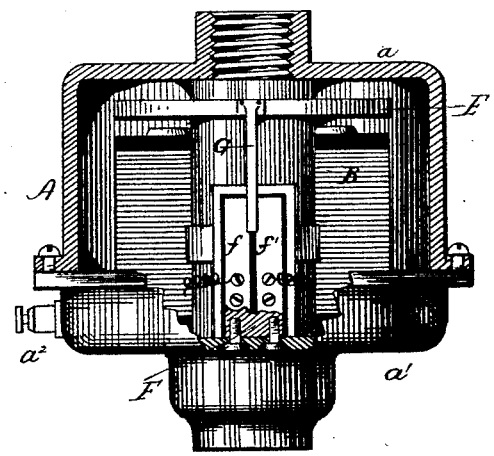
Figure 5:
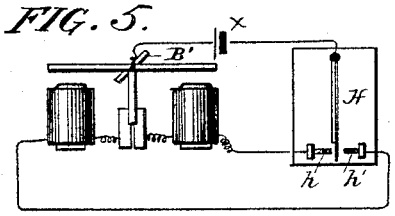
Figure 6:
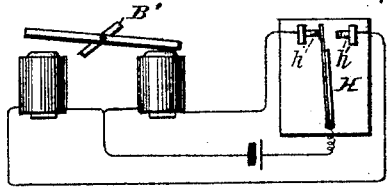

In the accompanying drawings, Figure 1 is a plan view of our device with the upper part of the casing removed and a portion of the disk-ring armature broken out. Fig. 2 is a vertical section on line 2 2 of Fig. 1. Figs. 3 and 4 are elevations from opposite sides with the casing partially broken away. Fig. 5 is a diagrammatic view illustrating the electric connections, and Fig. 6 is a similar view illustrating a modification hereinafter referred to.

A indicates the casing formed of two flanged portions $a$ $a'$, the lower one $a'$ having binding-posts $a^2$, and each part having a screw-threaded neck $a^3$, whereby the casing, united at the flanges and containing the valve and operating parts presently to be described, may be fitted to the inlet and outlet pipes (not shown) or may be inserted in and connected with any system of piping.

The lower part $a'$ of the casing is provided with an annular shoulder $a^4$, which supports one end of the valved tube B, the upper end of which rests against the inner face of the upper part $a$ of the casing, and at each end of the tube a packing may be placed to prevent the escape of fluid into the casing outside of the tube. This tube is held centrally in the casing by its lower end fitting snugly into the enlarged seat above the shoulder $a^4$, and, if desired, the upper end might be similarly fitted. The valve B' is hung on trunnions $b'$ in the tube, and an annular seat $b^2$ is provided for the edges of the valve. One of the trunnions extends through and carries a pinion $b^3$ outside of the tube, and this trunnion may, if desired, pass through a stuffing-box.

In the annular chamber, between the tube and casing, are secured the spools $c$ $c$ and $d$ $d$ of the two compound magnets C and D, respectively, and the cores of the magnets are secured, as by screws $l$, directly to the bottom of the metallic casing, whereby the latter forms the back yoke of the said compound magnets.

E is the armature, in the shape of a disk-ring, extending over the projecting ends of the four cores and pivoted upon a rod or bar $e$, which, as shown, is mounted in the tube B.

To the inner edge of the ring-armature and at the pivoted center thereof is secured the upper end of an arm $e'$, which carries a segmental rack $e^2$, engaging the pinion $b^3$ of the valve. Therefore, since one of the compound magnets is located on one side of the pivotal center of the armature and the other compound magnet on the other side, an electric current directed through one or the other of the magnets will operate to open or close the valve.

To the bottom of the casing $a'$ and in the same vertical plane with that of the pivots of the valve and armature is secured a bracket F, having two contacts $f$ $f'$, insulated from each other, and a wire leads from each of the contacts to its respective compound magnet.

To the outer edge of the armature and at its pivotal center is secured a contact-brush G, and a wire leads from this brush to a battery X.

H indicates a thermostat of any ordinary or preferred kind, adapted to carry and switch an electric current. On opposite sides of the movable end of the thermostat are contacts $h$ $h'$, each connected with one of the compound magnets, and the fixed end of the thermostat is wired to the battery, which in the preferred form shown in Figs. 1 to 5, inclusive, is an open-circuit battery.

In operation, with the parts in an intermediate position, as indicated in Fig. 5, an increase or decrease in temperature causes the thermostat to make contact at $h$ or $h'$ and so complete the circuit through magnets C or D, respectively, and open or close the valve accordingly. Supposing, for instance, an increase of temperature causes a contact at $h$. This energizes magnet C, and the valve is so connected that it will be closed by the tilting of the armature, and this tilting immediately removes the brush G from contact $f$ to contact $f'$, and the circuit is broken at $f$ and G, leaving the battery-circuit open. When a decrease of temperature causes the thermostat to make contact at $h'$, the brush G, resting on plate $f'$, allows one magnet D to be energized, thus opening the valve, transferring brush G to plate $f$, and again breaking the battery-circuit.

Fig. 6 illustrates a modification in which a closed-circuit battery is employed and the contact-plates and brush are omitted, and the wire from the battery is simply branched to connect with both compound magnets. In this form the thermostat, making connection at $h$ or $h'$, energizes one or the other of the magnets and operates the valve, it being understood that when the circuit of one magnet is closed, as at $h$, the circuit of the other magnet is broken at $h'$.

The binding-posts $a^2$ (shown in Fig 2) are for the wires leading to the thermostat-contacts $h$ and $h'$ and the battery.

Having thus described our invention, we claim—

1. In an electro-magnetic valve-controller, the combination, with the valve, of a pair of compound magnets, a pivoted disk-ring armature for said magnets, an arm extending from the armature and having a rack at its end, and a pinion carried by the valve and engaged by said rack, substantially as described.

2. An electro-magnetic valve-controller consisting of a casing having a valved fluid-passage extending through it, two electro-magnets, one located on each side of the passage, a pivoted armature surrounding the passage and acted upon by both magnets, two arms connected with the armature centered with its pivots, one of said arms carrying a rack and the other serving as an electrical contact, a pinion connected with the valve-stem and engaging with said rack, a pair of contacts adapted to be engaged by said contact-arm, and electrical connections whereby first one magnet and then the other will be energized as the armature vibrates.

In witness whereof we have hereunto signed our names in the presence of two subscribing witnesses.

LOUIS BELL.
FRANK H. ROOT.

Witnesses as to Bell:
WM. A. ROSENBAUM,
THOMAS K. TRENCHARD.
Witnesses as to Root:
FRANK QUINN,
H. W. CHRISTIAN.